United States Patent [19]
Ehrlich et al.

[11] 4,357,594
[45] Nov. 2, 1982

[54] VEHICULAR HAZARD WARNING SYSTEM

[75] Inventors: Paul Ehrlich, Loveland; Michael Wilson, Berthoud, both of Colo.

[73] Assignee: Traffic Safety Devices Company, Loveland, Colo.

[21] Appl. No.: 155,295

[22] Filed: Jun. 2, 1980

[51] Int. Cl.³ .................... B60Q 1/26; G01P 15/00
[52] U.S. Cl. .......................... 340/72; 340/66; 340/69; 340/52 H; 340/71; 340/669; 73/495; 73/510; 73/652; 200/61.45 R; 364/426; 324/162; 324/166
[58] Field of Search ............ 340/72, 66, 69, 71, 340/52 H, 52 F, 52 R, 665, 669, 670, 689, 686; 364/424, 426; 200/52 A, 61.45 R, 61.39, 61.52; 73/652, 382 G, 488, 494, 495, 510-512, 514, DIG. 1; 324/162, 165, 166, 178, 180, 160

[56] References Cited

U.S. PATENT DOCUMENTS

| | | | |
|---|---|---|---|
| 2,734,105 | 2/1956 | Perry | 200/61.89 |
| 2,741,674 | 4/1956 | Richard | 200/61.45 R |
| 2,832,864 | 4/1958 | Rapp | 200/80 |
| 3,021,402 | 2/1962 | La Warre et al. | 340/72 |
| 3,375,496 | 3/1968 | Antunovic | 340/72 |
| 3,478,312 | 11/1969 | Lee | 340/67 |
| 3,519,987 | 7/1970 | Jania | 340/72 |
| 3,564,532 | 2/1971 | Ando | 340/71 |
| 3,638,181 | 1/1972 | Bryant | 340/71 |
| 3,702,459 | 11/1972 | Bauchan | 340/62 |
| 3,708,782 | 1/1973 | Mori | 340/66 |
| 3,943,345 | 3/1976 | Ando et al. | 364/426 |
| 4,070,562 | 1/1978 | Runo et al. | 364/426 |
| 4,107,647 | 8/1978 | Yoshino | 340/72 |
| 4,231,013 | 10/1980 | Freeman et al. | 340/72 |

Primary Examiner—John W. Caldwell, Sr.
Assistant Examiner—Donnie L. Crosland
Attorney, Agent, or Firm—Hugh H. Drake

[57] ABSTRACT

A vehicular hazard warning system has an indicator on the vehicle that is energizable to yield a warning signal. The onset of a hazardous condition is detected and, as a result, a control signal is developed which has a variable parameter the amount of which is proportional to the degree of hazard represented by the condition. In response to that condition, the indicator is energized in a manner which quantitatively has a magnitude that is proportional to the amount of hazard. The system primarily responds to abrupt deceleration. It also preferably is responsive to such other inputs as brake pressure, wheel speed change, inertial forces and operator-controlled pedal movement.

9 Claims, 19 Drawing Figures

Fig_1

Fig_2

Fig_3

Fig_4

Fig_5

Fig_6

Fig_8

Fig_9

Fig_10

Fig_7

Fig_15

Fig_11

Fig_12

Fig_13

Fig_13a

Fig_14a

Fig_14

Fig_16

Fig_17

VEHICULAR HAZARD WARNING SYSTEM

The present invention pertains to vehicular hazard warning systems. More particularly, it relates to a system that warns a following driver of the possibility of a hazard presented by a preceding vehicle.

It has long been the custom to provide vehicles with so-called brake lights that respond to brake pedal movement and serve to inform a following vehicle driver that the vehicle in front of him is having its brakes applied. Of course, that alerts the following driver to slow down, if necessary, in order to avoid collision with the forward vehicle which may be decelerating for the purpose of stopping or turning. Coupled with the foregoing is the now-usual provision on the rear of a vehicle of a periodic visible signal which indicates an intention to turn in a particular direction. In general, the brake light may be separate from or included within a normal running light. In some cases, the indication of a turning movement has been indicated by other means such as a separate turning signal or a sequentially-directed flashing of successive lights.

Related to the foregoing has been the general adoption of flashing hazard lights. By means of a separate switch, the operator of a vehicle causes lights, usually at both the front and rear, to flash at a fixed rate for warning another vehicle that there is an unusual condition, such as that the vehicle is stopped on the edge of the road, the operator of a lead vehicle has seen a hazard on beyond or whatever. That invites the other driver to exercise extra care.

Although not widely practiced, it also has been suggested to provide a warning to following vehicles with regard to deceleration of a lead vehicle. Such a warning may be initiated by throttle linkage movement, change in inertia, change in speed or change in hydraulic pressure within the brake system. Believed to be representative of such prior art are U.S. Pat. Nos. 2,734,105—Perry, 2,832,864—Rapp, 3,375,496—Antunovic, 3,478,312—Lee, 3,638,181—Bryant, 3,702,459—Bauchan and 3,708,782—Mori. Bryant used an inertia switch control to operate a warning light upon a sudden release of the throttle, while Rapp disclosed several different speed-change responsive mechanisms for operating a light. Antunovic caused one or more lights to flash upon deceleration as sensed in the acceleration linkage, and Bauchan effected energization of one particular group of brake lights upon deceleration beyond a certain rate, employing an inertia switch as a sensor. Mori sensed either brake pedal movement or brake hydraulic pressure for the purpose of increasing brightness of or flashing the brake lights upon abrupt application of the brakes. Lee effects a blinking of warning lights in response to change in acceleration. Similarly, Perry caused lights to flash in response to throttle linkage movement.

In addition to the warning which is afforded upon illumination of one or more brake lights in response to actuation of the brakes of the vehicle, it, therefore, also has been contemplated to provide a further indication that a vehicle is decelerating to a degree such that it may pose a hazard to a following vehicle. Analogous to the illumination of mere brake lights, however, the aforesaid prior arrangements serve to indicate only that deceleration is occurring. They do not display the rate of deceleration and, therefore, do not provide an indication of the degree of the potential hazard. It is, accordingly, a general object of the present invention to provide a new and improved hazard warning system which yields an indication of the degree of potential hazard.

Another object of the present invention is to provide a new and improved hazard warning system in which an indicator is energized in a manner which quantitatively has a magnitude that is proportional to the degree of deceleration of the vehicle.

A further object of the present invention is to provide a new and improved hazard warning system which distinguishingly indicates the severity of an impending or existing hazardous situation.

Still another object of the present invention is to provide a new and improved hazard warning system that indicates the degree of the hazard presented in response to any one of a plurality of sensed conditions.

A still further object of the present invention is to provide a new and improved hazard warning system in which a hazardous condition is indicated in response to abnormal movement of the vehicle in any direction.

A vehicular hazard warning system in accordance with the present invention includes an indicator on the vehicle that is energizable to yield a warning signal. The onset of a hazardous condition of the vehicle is detected for developing a control signal that has a variable parameter the amount of which is proportional to the degree of hazard represented by the condition. Responsive to that parameter are means for energizing the indicator in a manner which quantitatively has a magnitude that is proportional to the amount of the parameter.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

Figure 17:
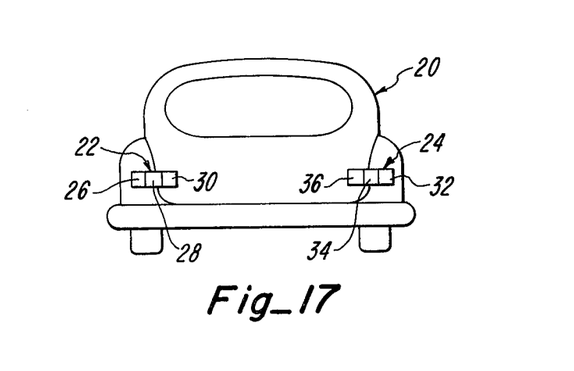
FIG. 17 is a rear end view of an automobile incorporating indicators located in accordance with one aspect of the systems described.

Turning first to FIG. 17, it will be observed that an automobile or equivalent vehicle 20 is provided with rear light assemblies 22 and 24 respectively on the left and right of vehicle 20. Assembly 22 in this illustrative case is segmented into three individual lights 26, 28 and 30 spaced successively from the side toward the center. Similarly, assembly 24 includes three individual lights 32, 34 and 36 analogously distributed in a row.

As an example of one arrangement for present-day usage, lights 26 and 32 may be running lights that are illuminated simply to indicate presence of the vehicle as observed from the rear. Lights 30 and 36 may be brake lights that are illuminated in response to depression of the vehicle's brake pedal, so as to afford an observer from the rear an indication that the brakes are being applied. In many instances, of course, the brake lights have been combined with the running lights so that the braking indication is observed as increased brightness of what appears to be the running light. Additional lights 28 and 34 may constitute turn signals. That is, light 28 may be flashed to indicate a forthcoming left-turn movement, while light 34 is periodically energized to indicate a right-turn movement. Instead of the provision of separate turn-signaling lights, it is known to provide that indication by flashing either or both of the running and brake lights. A known alternative for indicating turning movement is to sequential energize a row of such lights in the direction of intended turn.

The systems to be described may be utilized to energize any one or more of existing lights such as those illustrated with respect to assemblies 22 and 24. Alternatively, entirely separate and differently disposed lights may be employed in association with the present systems. That is, they may be located elsewhere on the rear of the vehicle, on its top or, perhaps in parallel, also on its front end.

In any case, implementation of the present systems contemplates the energization of one or more lights in a distinctive manner, the lights having a sufficient intensity of illumination to be visible to an observer either by day or night. In principle, however, the distinctive signal could be in another form such as a flag, an emission of particles or the transmission of a radio-frequency or ultrasonic signal receivable and detectable by an observer who is to be warned.

Figure 1:
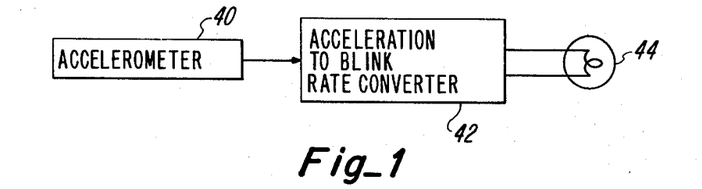
FIG. 1 is a block diagram of an embodiment of one generalized aspect of the present invention.

As shown in FIG. 1, the generalized hazard warning system includes an accelerometer 40 which feeds an acceleration-representative signal to a converter 42 that changes acceleration information into a blink rate. Converter 42 energizes a hazard light 44 periodically in accordance with the blink rate.

Figure 2:
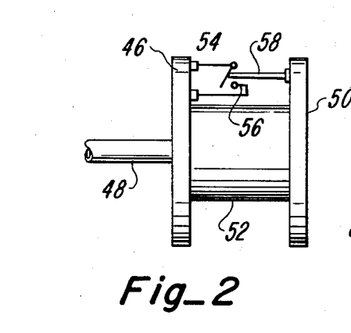
FIG. 2 is a fragmentary side elevational view of one embodiment of a component which may be utilized in the system of FIG. 1.

An elemental mechanical implementation of the system of FIG. 1 is shown in FIG. 2. A disc 46 is driven in rotation by a speedometer cable 48, so that its speed of rotation is proportional to the speed of the vehicle. A second rotatably mounted disc 50 is coupled to disc 46 by a unidirectional clutch 52. Mounted near the periphery of disc 46 and facing disc 50 is a movable electrical contact 54 engageable with a fixed electrical contact 56 similarly mounted on disc 46. A switch operator 58 projects from near the periphery of disc 50 toward contact 54 and is so located as to disengage contact 54 from contact 56 whenever disc 50 is so positioned relative to disc 46 as to effect engagement between operator 58 and contact 54, the latter otherwise normally being urged into engagement with contact 56.

Upon acceleration or constant motion of the associated vehicle, clutch 52 moves disc 50 in unison with disc 46. When the vehicle decelerates, on the other hand, disc 50 is disengaged by clutch 52 so as to free-wheel and thereby slowly lose speed relative to disc 46 which decelerates in rotation at the same rate of the vehicle by reason of its direct attachment to speedometer cable 48. As disc 50 decelerates relative to disc 46, operator 58 periodically disengages contact 54 from contact 56. The rate at which contacts 54 and 56 are opened by operator 58 is proportional to the amount of deceleration of the vehicle. With contacts 54 and 56 being connected in series with a power source and hazard light 44, the latter is caused to blink at a rate which is proportional to the degree of deceleration of the vehicle. Considering that rapid deceleration of the vehicle represents an increase in danger to a following vehicle, it will thus be seen that the closure of contacts 54 and 56 constitutes a detection of the onset of a hazardous condition and that the rate of closure is proportional to the degree of the hazard represented by a severe deceleration.

FIGS. 3–6 illustrate a more sophisticated implementation of the system of FIG. 1. The various principal components are disposed within a housing 60 to one end of which is coupled, as at 62, a sheath 64 within which is disposed a speedometer cable 66. Although cable 66 may derive its rotation by way of the transmission of the vehicle or otherwise, its speed of rotation is representative of that of the wheels of the vehicle over a road or other surface. The terminal end 68 of cable 66 is coupled to a shaft 70 journaled for rotation and upon which is mounted a driving rotor 72. Thus, driving rotor 72 rotates at a speed which simulates the actual speed of the vehicle.

Figure 3:
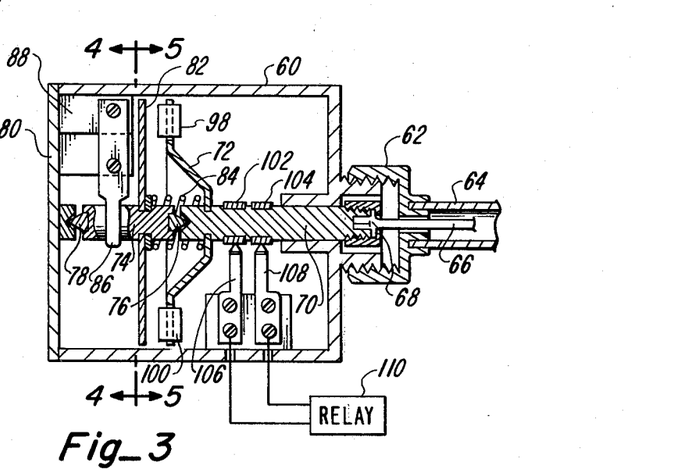
FIG. 3 is a longitudinal cross-sectional view of another embodiment of an alternative component which may be utilized in the system of FIG. 1.
Figure 4:
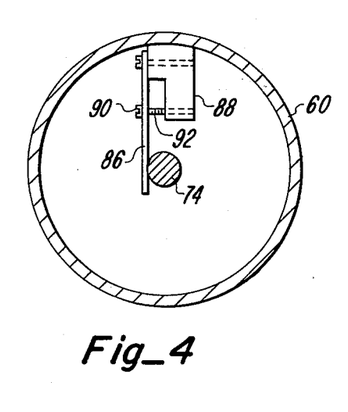
FIG. 4 is a cross-sectional view taken along the line 4—4 in FIG. 3.

Axially aligned with shaft 70 is an axle 74 mounted by needle bearings 76 and 78 between an end wall 80 of housing 60 and the inward end of shaft 70. Mounted upon axle 74 is a driven rotor 82 spaced a short distance from the periphery of rotor 72. A spring-type or "Sprague" clutch 84 couples shaft 70 to axle 74, so as to permit driving of axle 74 by shaft 70 in unison when shaft 70 turns in a direction representative of acceleration of the vehicle but which permits axle 74 to be uncoupled from shaft 70 when the latter decreases in its speed of rotation as when the vehicle is decelerating.

Urged against the surface of axle 74 is a drag blade 86 that tends frictionally to arrest rotation of that axle. Blade 86 is secured to a block 88 affixed to housing 60. A screw 90 spring loaded as at 92 enables adjustment of the pressure of blade 86 against the side of axle 74.

Figure 5:
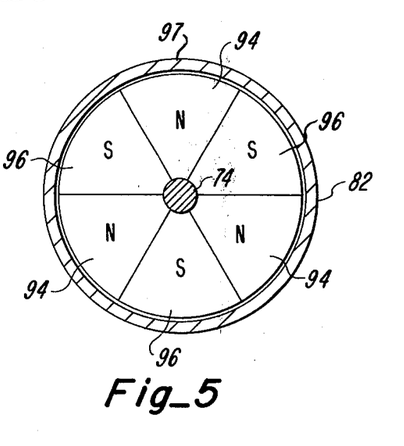
FIG. 5 is a cross-sectional view taken along the line 5—5 in FIG. 3.

Driven rotor 82 is composed of a series of circumferentially-spaced segments 94 and 96 magnetized to exhibit successively alternate polarities. Disposed near the periphery and on diametrically opposite sides of disc 72 are respective ones of a pair of electromagnetic pickup coils 98 and 100. Coils 98 and 100 are electrically connected in series by conductors (not shown) which lead to slip rings 102 and 104 that encircle shaft 70. Respective electrical brushes 106 and 108 ride on slip rings 102 and 104 and are connected through wiring that leads from housing 60 to a relay 110.

Conveniently, segments 94 and 96 may be formed of a rubber that contains magnetizable particles. In that case, the periphery of the segments may be supported by a circumferential ring 97 of rigid material.

By reason of clutch spring 84, driven rotor 82 always rotates at a speed at least as great as the speed of rotation of speedometer cable 66. When the speed of rotation of cable 66 drops, such as when the vehicle is decelerating, rotor 82 is allowed to coast at a speed which is greater than that of rotor 72. Blade 86 enables the application of a degree of frictional drag upon the speed of rotation of rotor 82, so as to simulate normal deceleration without breaking. Rotor 82 must have a sufficient mass to simulate a model of vehicle momentum. Its mounting by way of axial bearings also simulates vehicle directional and wind resistance drag.

Driving rotor 72 is directly driven by the input from speedometer cable 66. Thus, the speed of rotor 72 always represents the actual speed of the vehicle. Pickup coils 98 and 100 develop a signal every time driven rotor 82 gains one revolution upon driving rotor 72. Slip rings 102 and 104 carry that signal to relay 110.

Housing 60 may be formed as a part of the otherwise conventional speedometer of the vehicle. It supports the bearing surfaces for the rotors and their respective shaft and axle as well as the provisions for the electrical contacts and the coupling to the speedometer cable. On the other hand, housing 60 may be an entirely separate unit coupled to receive an indication of vehicle speed either jointly or separately from that given to the ordinary speedometer. Moreover, the assemblage within housing 60 may be arranged so as to transmit a representation of vehicle speed on to a speedometer in a manner analogous to that discussed hereinafter with regard to the apparatus of FIG. 8.

Relay 110 is a signal modifier that interrupts the current fed to hazard light 44 whenever there is an input signal to relay 110 developed by pickup coils 98 and 100. Preferably, relay 110 permits hazard light 44, if it also serves other functions such as indicating normal braking, to operate normally despite any malfunction within the system under particular discussion. It also is preferred that relay 110 introduces a constant interruption cycle of short duration as compared with the frequency of signals derived by means of pickup coils 98 and 100. It appears that such action provides a better visual signal in representation of the hazard indicated by rapid deceleration.

Figure 7:
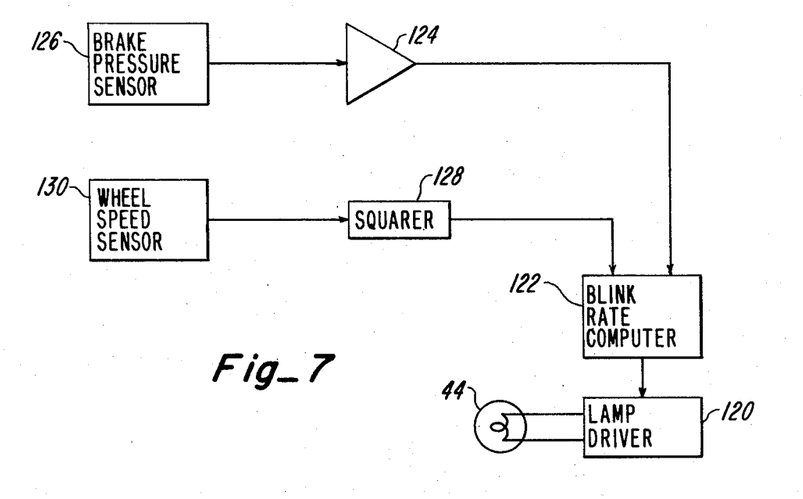
FIG. 7 is a block diagram of a particular embodiment of a hazard warning system.

In fundamental contemplation, relay 110 serves to cause a blinking of a hazard light, such as lights within assemblies 22 and 24, periodically at a rate which is proportional to the degree of hazard represented by the amount of deceleration. Alternatively, relay 110 may be devised to turn on a greater number of individual hazard lights when the degree of hazard is increased as represented by an increasing rate of deceleration of the vehicle. FIG. 7 illustrates a system adapted to these purposes and which affords flexibility. In this case, hazard light 44 is energized by a lamp driver 120 actuated by a blink rate computer 122. Computer 122 has as a first input a signal delivered from an amplifier 124 in response to a brake pressure sensor 126. A second input to computer 122 is by way of a squarer 128 from a wheel-speed sensor 130.

Typical and conventional braking systems for vehicles employ hydraulic fluid pressurized by operator action to effect a braking action upon the wheels of a vehicle either directly or indirectly. The hydraulic pressure within the system is representative of the degree of braking implemented, and sensors of such brake pressure as well known and readily available. Usually, such a pressure sensor is installed in a hydraulic line which carries the brake fluid. Correspondingly, sensor 126 develops a signal which is representative of such as hydraulic brake pressure. Its signal is fed through amplifier 124 to computer 122.

Figures 6, 8, 9, 10:
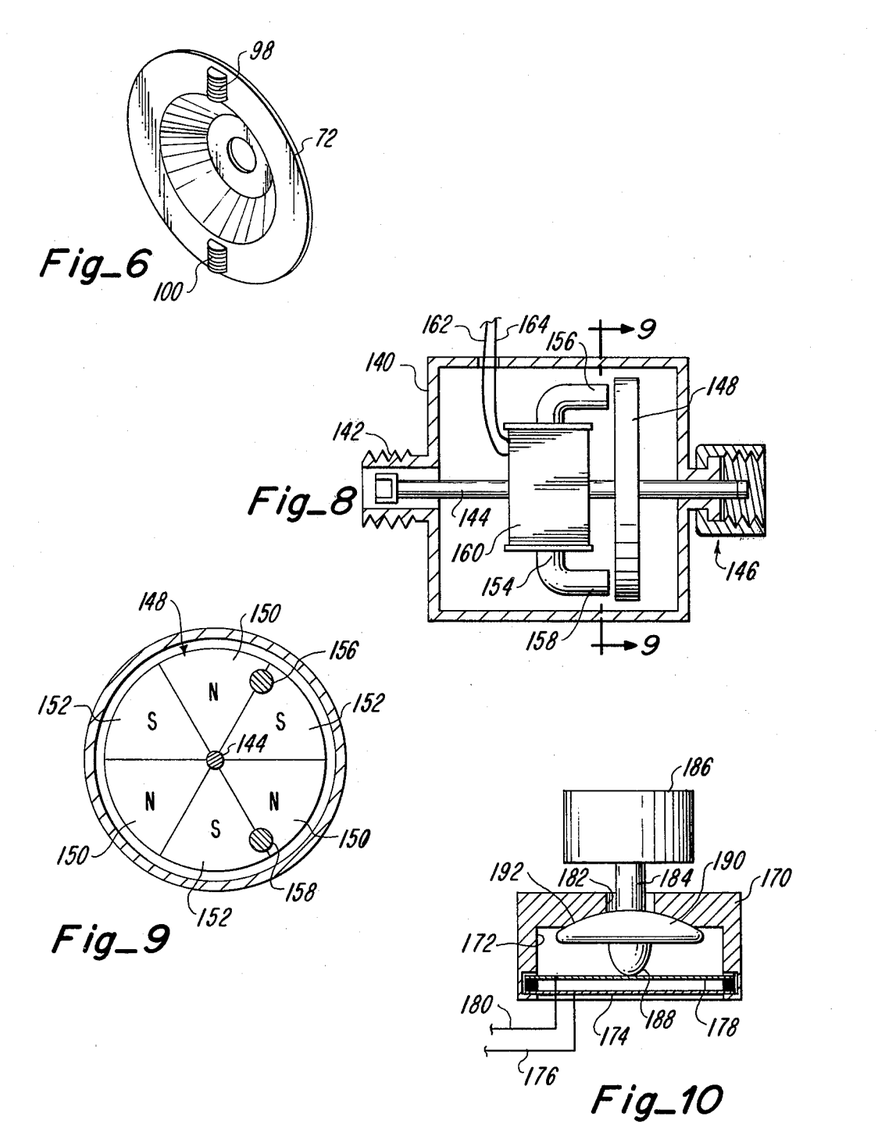
FIG. 6 is a perspective view of an element operative within the apparatus of FIG. 3.
FIG. 8 is a longitudinal cross-sectional view of a component employed in the system of FIG. 7.
FIG. 9 is a fragmentary cross-sectional view of a component included within the apparatus of FIG. 8.
FIG. 10 is a centrally-taken cross-sectional view of another component advantageously utilized within the systems of the present invention.

The ordinary speedometer in an automotive vehicle is, of course, a form of wheel-speed sensor. It yields a visible indication of the speed of the vehicle usually by means of a rotational input that is derived from the drive-train transmission which necessarily is mechanically coupled to the wheels that propel the vehicle. Sensor 130 may be implemented in any convenient manner which affords a representation of vehicular speed over the ground. One particular embodiment is illustrated in FIGS. 8 and 9. In that case, a housing 140 has an input coupling 142 that receives an output end of a conventional speedometer cable to drive in rotation a shaft 144. Housing 140 also defines an output coupling 146 at the other end of shaft 144 and to which there is afforded a continuing connection to the conventional speedometer of the vehicle. Thus, housing 140 represents a device that may be inserted into the conventional speedometer coupling arrangement without the necessity of modifying the speedometer mechanism itself.

Mounted upon shaft 144 is a rotor 148 composed of a series of circumferentially-spaced segments 150 and 152 of a material magnetized to exhibit successively alternate respective magnetic poles. It will be observed that rotor 148 may be constructed in the same manner as rotor 82 in FIG. 5. Disposed within housing 140 is a U-shaped magnetic core 154 which defines a pair of pole pieces 156 and 158 positioned off the axis of shaft 144 so as to span a pair of segments 150 and 152. An electromagnetic coil 160 is wound about the bight portion of core 154 and terminates in output electric leads 162 and 164.

In response to rotation of the speedometer cable, a signal appears on leads 162 and 164 which is representative of speed of the vehicle. The vehicular wheel speed is indicated by the repetition rate of what is approximately a sinusoidal waveform generated by coil 160 in response to magnetic interaction with rotor 148.

The apparatus of FIGS. 8 and 9 represents a mechanical adaptor for insertion in series with the speedometer cable drive of a conventional vehicle. Alternatively, an analogous magnetic pickup may be disposed either in the vicinity of a suitably magnetized gear in the transmission of the vehicle or a similarly located structure on a wheel thereof. Of course, other more sophisticated techniques could be utilized to detect vehicle speed. For present purposes, it is only necessary to consider that sensor 130 develops and delivers a signal which is representative of the actual speed of the vehicle over the surface upon which it is moving.

Figure 11:
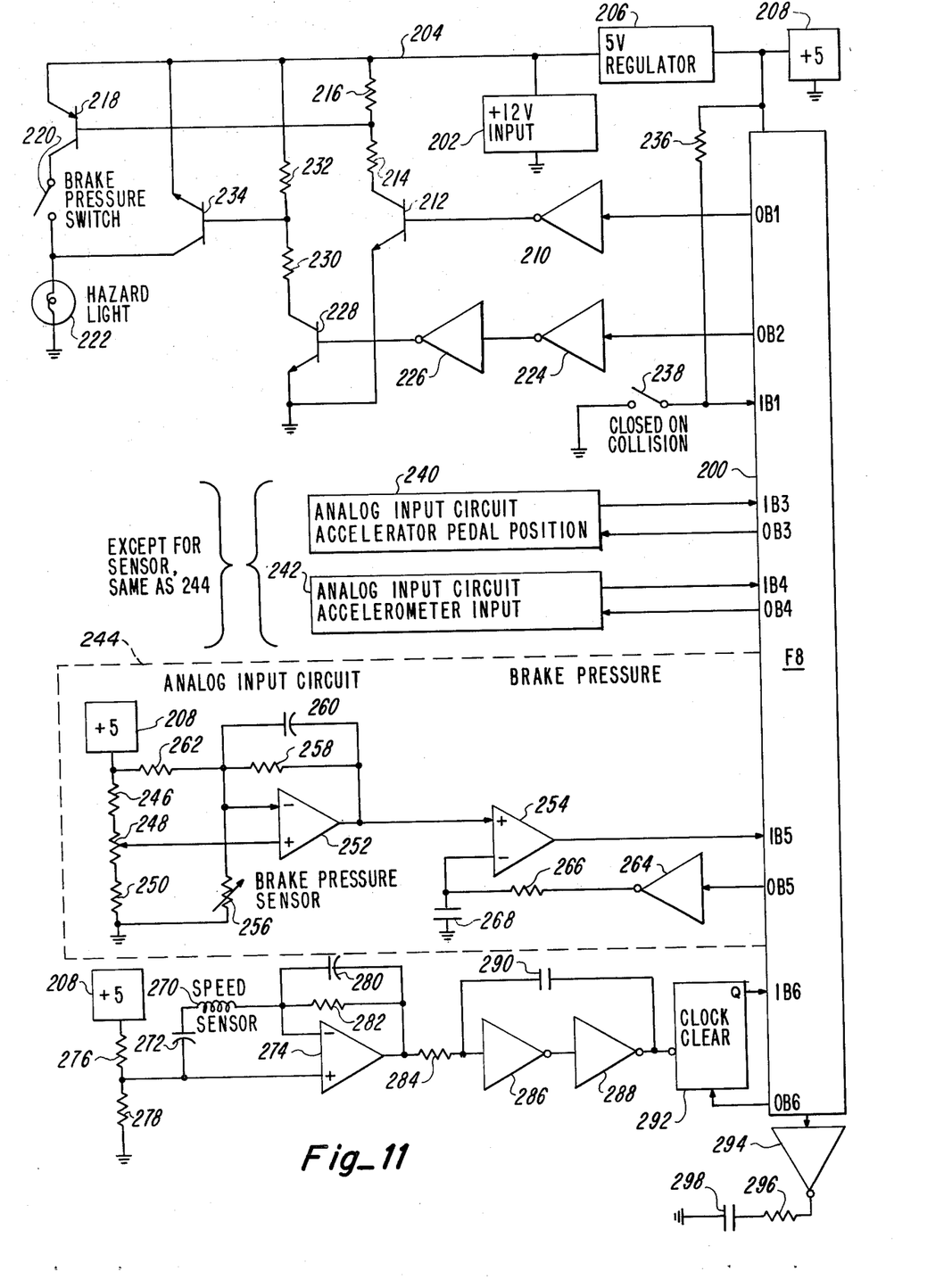
FIG. 11 is a schematic diagram of a particular system which may be utilized to implement the arrangement of FIG. 7.

Computer 122 may be implemented with the use of either analog or digital circuitry that presently is state of the art. Desirably, however, a microprocessor approach is employed as indicated in FIG. 11. Because a wheel speed sensor of the kind described yields a sinusoidal signal, the desired digital response predicates the inclusion of squarer 128, so as to develop a signal in pulse form. Of course, squarer 128 need be no more than a saturating amplifier with postive feedback to provide a constant amplitude square wave output.

In any case, computer 122 serves to develop a representation of vehicular speed. Conveniently, that is accomplished by measuring the number of cycles of representative rotation, such as of the speedometer cable, per unit of time. It then is rather fundamental to calculate the degree of deceleration by determining the difference of two successive measurements of such rotational speed and dividing that value by the time interval between such measurements. Given a deceleration signal as well as a brake pressure signal, computer 122 determines a desired rate of blinking of hazard light 44 in accordance with any appropriately-selected formula. Of course, the desired rate of blinking of light 44 must be such as to be determinable visually by an observer, whereas the sensor inputs may be in the form of a signal pulsating at a much higher rate.

The reciprocal of the blink rate, determined by computer 122, is the blink interval. It is that interval which preferably is utilized to control the on and off time of light 44. Desirably, computer 122 includes an interval timer which provides an interrupt at the end of a period determined by a count loaded thereinto. The blinking of light 44 is implemented by a process which involves energizing light 44, loading a blink interval into the interval timer and waiting for an interrupt. When the interrupt occurs, light 44 is turned off and an off-time interval is loaded into the timer. After awaiting the re-occurrence of the interrupt, light 44 again is turned on so as to repeat the process. Preferably, lamp driver 120 is driven directly from an output port of computer 122.

In a more detailed implementation of the system of FIG. 7 that is described hereinafter, it is desired that input signals from other sensors also be accommodated and utilized. One such sensor is a generator which develops a signal that represents an abrupt change of acceleration of the vehicle in any direction. That is, it is desired to sense a change from normal in the movement of the vehicle not only in a fore or aft direction but also in either direction transverse thereto. To this end, FIG. 10 discloses an acceleration-sensitive device that includes a cup-shaped housing 170 which defines a cavity 172. Closing cavity 172 is a first electrically-conductive member 174 insulatingly supported from housing 170 and to which is connected a lead 176. A second electrically-conductive member 178 is disposed in parallel to member 174 but spaced inwardly therefrom. Member 178 is connected to an external lead 180. An opening 182 in the end wall of housing 170 opposite member 178 freely receives a normally vertical shaft 184 upon the outer end of which is affixed a mass 186. The inward end of shaft 84 is formed into a nose 188 that is engaged against member 178 which is resilient to lateral flexure thereof. Encircling shaft 184 is a collar 190 which presents a concave surface 192 that faces the interior of the end wall of housing 170 opposite member 178.

Housing 170 is so located within the vehicle that member 178 is horizontally disposed. Upon any change in the rate of movement of the vehicle in any direction, mass 186 is inertially driven in line with that direction so as to swing shaft 184 effectively about a pivot within opening 182 and thereby rock nose 188 in a corresponding lateral direction and as defined by concave surface 192. That rocking of nose 188 enables flexure of member 178 away from member 174. In consequence, the electrical capacitance defined between members 174 and 178 is changed in correspondence with the change of rate of movement of the vehicle.

The apparatus of FIG. 10 constitutes what may be called a "Gee-switch". That is, it provides an output signal in response to a change of acceleration afforded to mass 186 which sufficiently overcomes its position of normal stability. In this particular case, the output signal on leads 176 and 180 is that of a variation in capacitance. In a different implementation, the arcuate movement of nose 188 could be used to flex member 178 so as physically to make or break an electrical contact between that member and member 174.

A presently preferred embodiment for achieving the aims of the present invention is shown in FIG. 11. The heart of the system of FIG. 11 is a microprocessor 200. It includes six output ports labeled OB1, OB2, etc., and a corresponding plurality of six input ports labeled IB1, IB2, etc. Energization of the entire system is provided by a 12-volt power supply 202 which conveniently may be the primary battery of the vehicle. The 12-volt potential is applied between a bus 204 and ground. Connected to bus 204 is a 5-volt regulator 206 which supplies power to a plurality of 5-volt terminals 208 and to an energizing terminal of microprocessor 200 as indicated.

The signal from output port OB1 is fed through an inverter 210 to the base of a transistor 212 the emitter of which is returned to ground and the collector of which is connected to bus 204 through a series of resistors 214 and 216. Transistor 212 drives a transistor 218 by means of a connection from the junction between resistors 214 and 216 to the base of that transistor. Its emitter is connected to bus 204, while its collector is fed through a brake pressure switch 220 to a hazard light 222.

As indicated in the above discussion with reference to FIG. 17, the hazard indication may take any of various different forms. As specifically illustrated in FIG. 11, however, hazard light 222 is the conventional brake light of the vehicle, and there typically are at least two of those wired in parallel. In the present case, therefore, transistor 218 normally is biased to a conductive state so that actuation of switch 220, which is in the conventional brake light switch standard on at least most vehicles, serves to energize light 222 whenever the brake pedal is depressed by the operator of the vehicle.

The output signal from port OB2 is fed through a series of two successive inverters 224 and 226 to the base of a transistor 228 the emitter of which is returned to ground and the collector of which is connected to bus 204 through series of resistors 230 and 232. The junction between resistors 230 and 232 is connected to the base of a transistor 234 the emitter of which is connected to bus 204 and the collector of which is returned to ground through hazard light 222. In operation, the output from port OB2 is a series of pulses which cause light 222 to blink at a rate determined by the frequency of repetition of those pulses. At the same time, the output level from port OB1 is such as to render transistor 218 non-conductive and thus prevent operation of light 222 by means of switch 220. This precludes overriding of the hazard-indicating blinking by reason of depression of the brake pedal by the operator.

A microprocessor input IB1 is normally maintained at a HI by connection through a resistor 236 to a terminal 208. However, input port IB1 is shunted to ground through a switch 238, so as to condition port IB1 to a LO. Switch 238 is a so-called "Gee" switch that is caused to close whenever there is an abrupt change in acceleration of the vehicle as in the case of an actual collision. Such switches are commercially available, having been used, for example, in downed aircraft locator beacons. A suitable switch of this kind would be one which closes whenever the change of acceleration exceeds one-hundred feet per second. Microprocessor 200 is so programmed that, on the actuation of switch 238, the output from port OB2 causes light 222 to blink at a maximum hazard.

Three different analog input circuits 240, 242 and 244 are connected respectively to input and output ports IB3, OB3 and IB4, OB4 and IB5, OB5. Each of these circuits serve to convert an analog representation to a digital value which is operated upon by microprocessor 200. Of course, numerous circuits are known for responding to an analog input in order to provide a representative level to a digital processing device. The particular arrangement specifically illustrated for circuit 244 is a commonly-known analog measurement technique that employs a combination of an input port and an output port of a microprocessor. In more detail, a voltage divider, that extends from a terminal 208 to ground, is composed of a series of resistors 246, 248 and 250. An adjustable tap on resistor 248 is connected to the plus input terminal of an operational amplifier 252 the output terminal of which is connected to the plus input terminal of still another operational amplifier 254. The output terminal of the latter is connected to input port IB5 of microprocessor 200.

Input circuit 244 responds to brake pressure applied by the operator in the same manner as sensor 126 discussed above in connection with FIG. 7. Thus, a variable-resistance sensor 256, the resistance of which is proportional to the amount of brake pressure, is connected between ground and the minus input terminal of amplifier 252. Completing the necessary circuitry, the parallel combination of a resistor 258 and a capacitor 260 is connected between that minus input terminal and the output terminal of amplifier 252, while the minus input terminal of the amplifier also is returned through a resistor 262 to power terminal 208. Output port OB5 of microprocessor 200 is connected through an inverter 264 and a resistor 266 to the minus input terminal of amplifier 254 which also is coupled to ground through a capacitor 268. Conventional programming loaded into microprocessor 200 enables amplifier 254 to deliver at input port IB5 digital signals that represent the analog value presented by sensor 256.

Analog input circuits 240 and 242 employ the same essential circuitry as that specifically illustrated for input circuit 244. However, input circuit 240 provides information as to relative position of the vehicle's accelerator pedal. Thus, a variable resistor (not shown) is mechanically coupled to the accelerator pedal linkage so as to present a resistance value which changes in proportion to amount of movement of the accelerator pedal. Input circuit 242 responds to a sudden change in acceleration of the vehicle. In this particular case, that change is represented by a variation in capacitance as particularly illustrated by use of the apparatus of FIG. 10 which previously has been discussed. Thus, leads 176 and 180 of the device of FIG. 10 are connected into a voltage divider so that the polarity on one side of the variable capacitor of the device of FIG. 10 is coupled to the minus input terminal of an operational amplifier 252.

Still further information is supplied to microprocessor 200 in form of a representation of speed of the vehicle. The sensing function is the same as that of sensor 130 discussed with regard to FIG. 7 and, for purposes of exemplary disclosure, is constructed in the manner described above in connection with FIGS. 8 and 9. It will be recalled that the particular outputs of the apparatus of FIG. 8 provide on its leads 152 and 154 a pulse signal with a repetition rate which is proportional to vehicular speed. The supply of those pulses is represented in FIG. 11 as a speed sensor 270 in the form of an inductance connected in series with a capacitor 272 and with that combination extending between the plus and minus input terminals of an operational amplifier 274. That plus input terminal also is connected to a tap on a voltage divider, composed of resistors 276 and 278, which extends between a terminal 208 and ground.

The parallel combination of a capacitor 280 and a resistor 282 is conventionally coupled between the minus input terminal of amplifier 274 and its output terminal. That latter output terminal is connected through a resistor 284 to the input of a series combination of inverters 286 and 288 with the output of the latter being coupled back to the input of the former by a capacitor 290 and also connected to the clock terminal of a flip-flop 292. The Q terminal of flip-flop 292 is connected to input port IB6 of microprocessor 200, while the clear terminal of flip-flop 292 is connected to output terminal OB6 of the microprocessor. The circuitry illustrated supplies a speed signal from sensor 270 to microprocessor 200 that digitally represents, as a series of pulses, the speed of the vehicle which contains the overall system.

For the particular arrangement illustrated, the negative power return of microprocessor 200 is coupled to ground through the series combination of an inverter 294, a resistor 296 and a capacitor 298. As such, this arrangement is conventional.

Of course, numerous microprocessors are currently available for carrying out the relatively simple tasks required for purposes of implementing the present invention. Illustrated herein is use of the commercially-available F8 microprocessor. The F8 microprocessor is available from Fairchild Camera and Instrument Corporation, 464 Ellis St. Mountain View, Calif. 94042. It is presently preferred by reason of its comparatively low cost in a single integrated circuit form and because it has eight-bit input/output ports. Those ports are under programmed control either to read a logic level on each corresponding pin or to generate a logic level on each such pin. It thus provides a convenient interface to the discrete-component external electronics circuitry. The F8 microprocessor contains 64 bytes of read/write memory and 1000 bytes of factory-programmed read-only memory. As is conventional, the read/write memory is used to store variables, while the read-only memory stores the program and all constants.

The read/write memory in the F8 microprocessor is of the scratch pad type. Each byte is an eight bit register and the organization of data in that memory is as shown in the following table:

| Register No. | Octal Address | Function |
| --- | --- | --- |
| 1–4 | 00–03 | Temporary Storage |
| 5 | 04 | S Counter |
| 6 | 05 | B Counter |
| 7 | 06 | C Counter |
| 8&9 | 07&08 | Pointers |
| 10–15 | 11–17 | Dedicated Registers |
| 16–23 | 20–27 | AN (0) to AN (7) |
| 24–31 | 30–37 | INC (0) to INC (7) |
| 32–39 | 40–47 | SPD (0) to SPD (7) |

In the foregoing table, "AN" refer to analogs, "INC" refers to increments and "SPD" refers to speeds.

Figure 12:
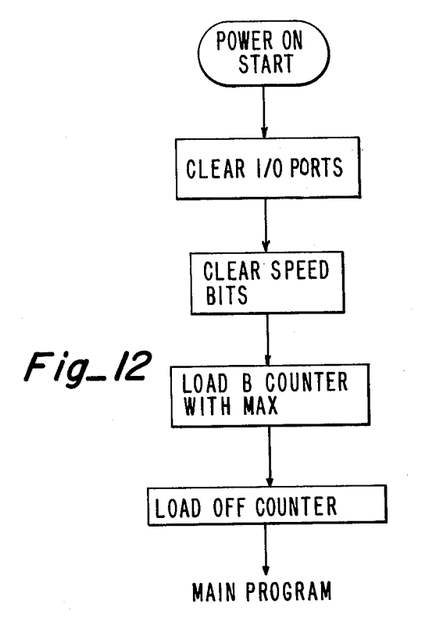
FIG. 12 is a routine programmed into a microprocessor included within FIG. 11.
Figure 13:
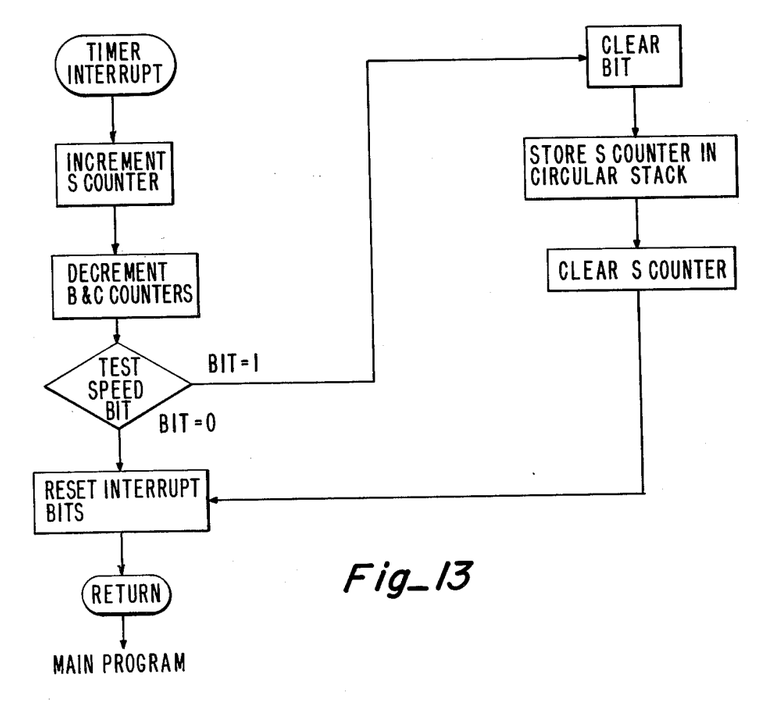
FIG. 13 depicts another routine programmed within that microprocessor.
Figure 14:
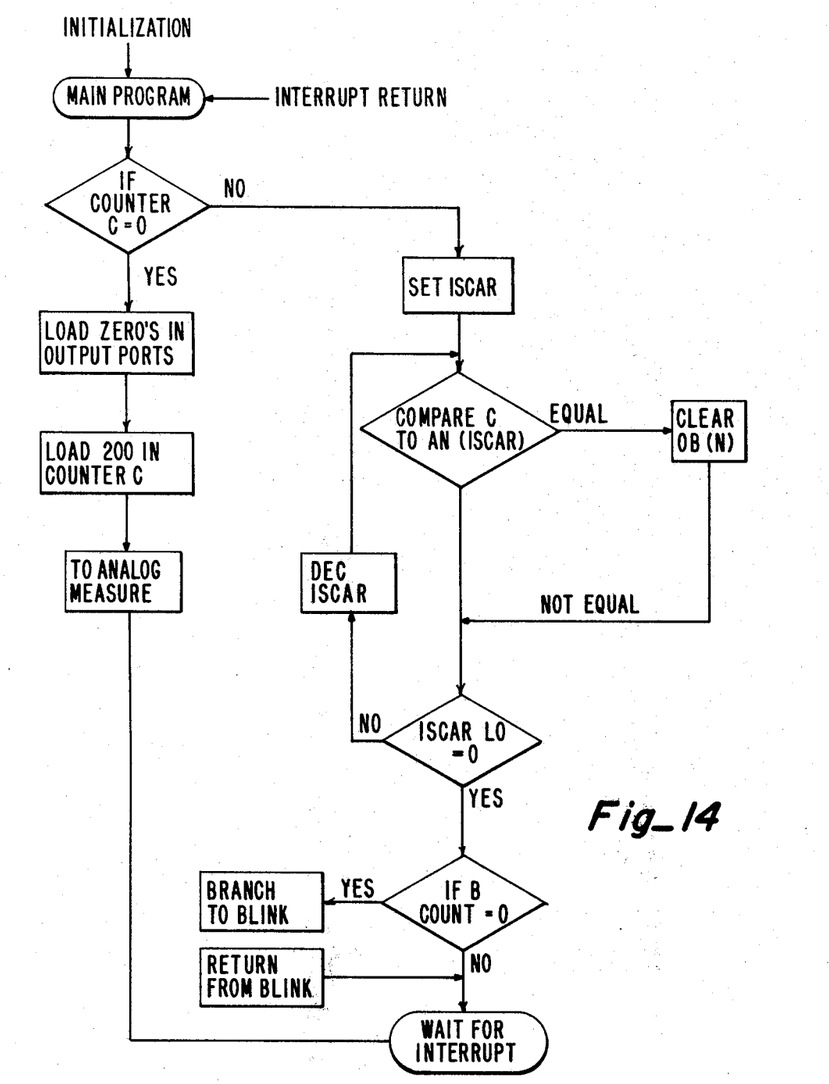
FIG. 14 is a further routine programmed within the microprocessor.

Given the desired end result together with an understanding of the objectives as well as of the kind of information inputs available, it is well within the state of the art to program any given microprocessor for the purpose at hand. Nevertheless, the routines involved in a suitable program that presently is preferred are set forth in FIGS. 12–16. An initialization routine, applicable only upon the initial application of power to the system, is illustrated in FIG. 12. FIG. 13 shows an interrupt routine, while FIG. 14 represents what may be called the main program. The analog measurement routine is shown in FIG. 15 and what is called a blink routine is the subject of FIG. 16.

The interrupt sequence as depicted in FIG. 13 is responsible for measuring the periodicity of incoming information and updating the counters as required by the other routines. The main program as represented in FIG. 14 is executed once each interrupt cycle. That main program generates variable-duty-cycle square waves as required for the analog measurement technique represented by the routine of FIG. 15 and the blink routine of FIG. 16. The main program calls for an analog measure at the end of each developed square wave. It also calls a blink each time light 222 is turned off.

Figure 15:
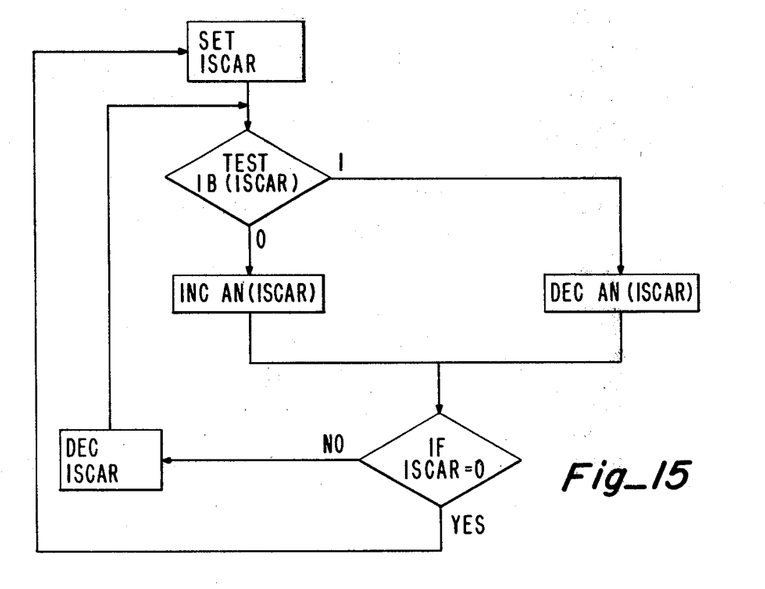
FIG. 15 illustrates a still further routine programmed within the microprocessor included within the system of FIG. 11.
Figure 16:
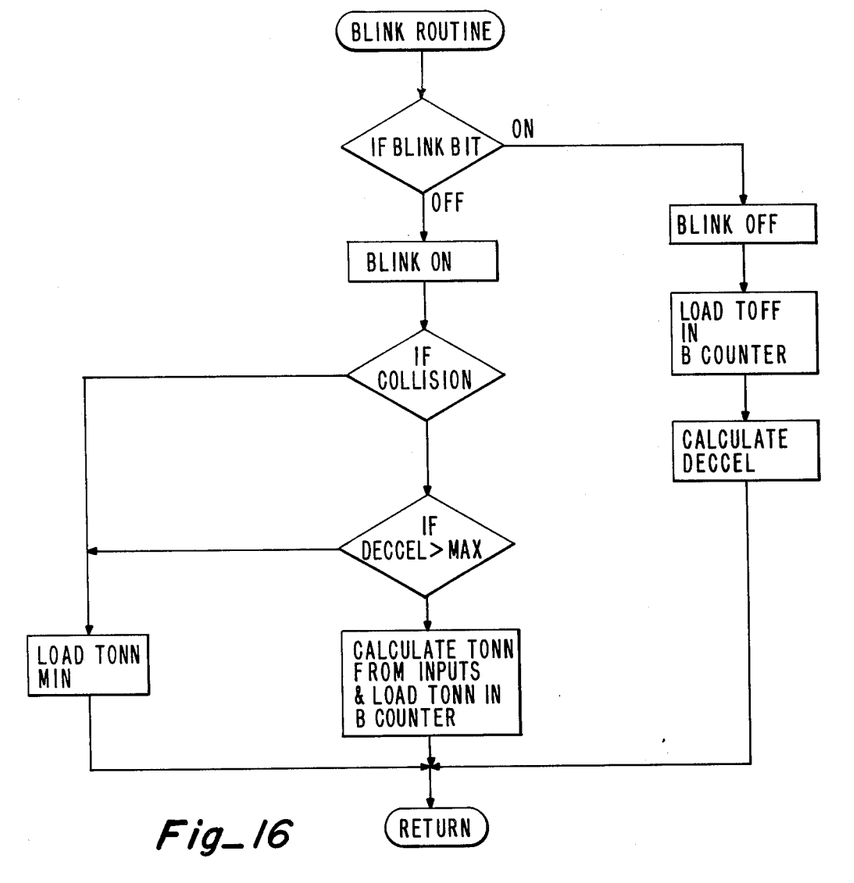
FIG. 16 depicts yet another routine programmed within that microprocessor.

The analog measure of the routine of FIG. 15 compares the average of each incoming square wave, as developed by input circuits 240, 242 and 244, against its input analog signal and adjusts duty cycle until equality is achieved; the percent duty cycle is then made equal to the percent of full scale of the analog input. The blink routine of FIG. 16 is executed each time light 222 is either energized or de-energized. It employs all of the input data, the period measurement from the interrupt sequence and the various analog measurements, so as to determine the on or off time for the next blinking of light 222.

Initialization, as represented in FIG. 12, is basically a clear-out operation to reset everything in a beginning from whatever might have remained in storage in the scratch-pad memory as a result of previous operation of the vehicle. Thus, the application of power for a start results in a clearing of all input/output ports, a clearing of all speed bits stored in registers 32–39, a loading of the B Counter at register 6 to represent a maximum on-time which corresponds with the lowest possible blinking rate of light 222 and the loading of the C Counter to represent a set number for off, such as one-tenth of a second. Upon initialization, the main program is set for operation.

Turning to the interrupt sequence of FIG. 13, it is first to be noted that the B Counter is used to count the on and off times for blinking, the C Counter is used to generate variable duty cycle square waves that are needed for analog measurement and the S Counter counts the period of the square wave coming from speed sensor 270. The addressable memory in microprocessor 200 constitutes a circular stack having eight memory locations for each function. The term ISCAR refers to a pointer register, a register which allows the pointing or addressing of information such as AN, INC or SPD as previously defined. The purpose of loading in a stack is to record speed history so a comparison can be made with the latest information received. When ISCAR is pointed at one of the locations in the circular stack and then is incremented, it counts to the end of the eight locations and then starts again at the first.

Figure 13A:
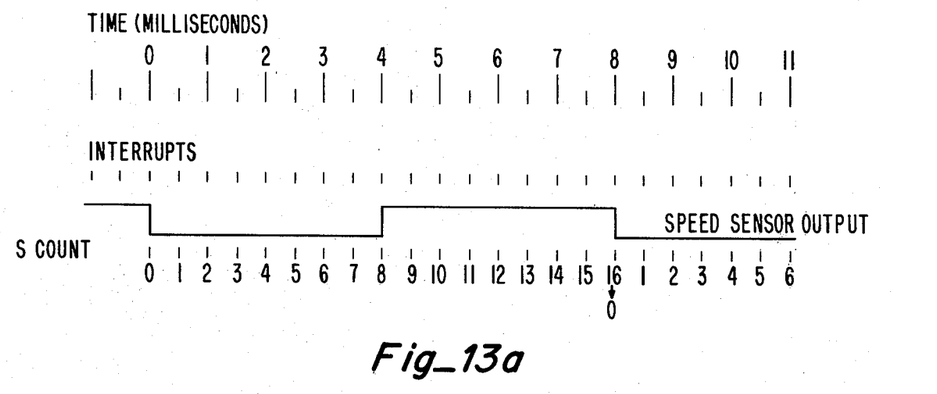
FIG. 13a is a timing diagram illustrative of the operation of the routine of FIG. 13.

In this particular embodiment, the interrupt sequence is called twice each millisecond by a timer internal to microprocessor 200. The output of sensor 270 is formed into a square wave the frequency of which is directly proportional to the vehicle's speed. Starting with the beginning of a cycle from the wheel speed sensor, the sequence of events is depicted in FIG. 13a. The sequence illustrated in FIG. 13a results in a count "14" being stored in the stack. Assuming that the next cycle from speed sensor 270 is of seven milliseconds duration, a count "14" would be stored in the next location in the stack. From those two measurements of periodicity, simple algebraic manipulation enables the calculation of both velocity and acceleration. The interrupt is at regular intervals, and the "Increment S Counter" in the routine amounts to a speed counter that counts periods.

Figure 14A:
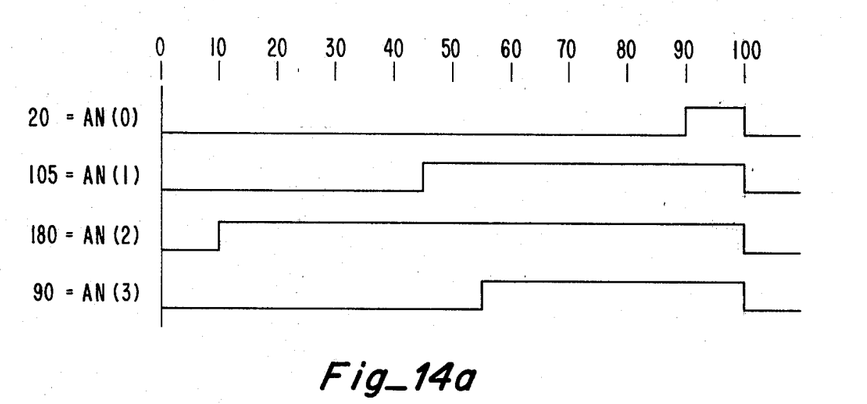
FIG. 14a is a timing diagram associated with the routine of FIG. 14.

The main program as represented in FIG. 14 is executed after each interrupt sequence. It generates the variable duty cycle square waves required by the analog measurement routines, and it also calls AN measure and BLINK when required. The period of all of the square waves generated by this routine are two-hundred counts of the C Counter which corresponds to one-hundred milliseconds. Starting at the beginning of the square waves (C=0), several events follow. All of the output ports are set to zero and the counter is set at two-hundred (C=200). Analog measurement is called to update the estimates of the input voltage levels. These estimates are stored as counts in one of the circular stacks of memory which is called AN(ISCAR), where ISCAR shows which member of the stack is being addressed. On the next interrupt, the main program would take the right hand branch in FIG. 14, because C would be one count down from two-hundred or equal to one-hundred ninety-nine. Each count in the circular stack AN is compared to the count C. If AN(ISCAR) is equal to C, its output bit is set to one. At the next interrupt of C=198, the process is repeated. A sample set of waveforms appear in FIG. 14a. On each interrupt cycle, the main program checks to see if the B counter has reached zero. If it has, the program calls for the blink routine. In this and other figures, the terminology "DEC" means to decrement, and the terminology "INC" means to increment, each by one count at a time. Of course, the description of the main program is applicable with respect to any of the various different analog inputs.

Referring now to the analog measurement routine of FIG. 15, this routine tests, at the end of each cycle of the square waves generated by the main program, to see whether the average of the square wave generated for its particular input is greater or less than the analog voltage being measured. That is represented by "TEST IB(ISCAR)". If the analog voltage is greater, it adds one count to AN(ISCAR). If the voltage is less, one count is subtracted. After a time, AN(ISCAR) because proportional to the analog input voltage.

Turning finally to the blink routine of FIG. 16, the purpose is to calculate deceleration when hazard light 222 is de-energized and to determine the subsequent "on" period when the light is re-energized. The blink routine is called when the B Counter reaches zero. Deceleration is calculated on the basis of information from the stack of speeds generated as recorded in accordance with the interrupt sequence, employing the equation:

$$\frac{\frac{1}{\text{Period (new)}} - \frac{1}{\text{Period (last)}}}{\text{Period (new)}} = \text{Deceleration.}$$

When light 222 is turned on, the blink routine checks for a collison or for extremely high deceleration. If either of those conditions is "true", the maximum blink rate is selected. Otherwise, the blink rate, that is, TONN and TOFF, is calculated from the various analog inputs, the speed and the deceleration. Such calculations are commonplace and may be accomplished by any one of a number of different algorithms that are well known and obvious to a person skilled in the art.

The end result of the implementation of the system of FIG. 11 is that of causing light 222 to blink at a rate which is proportional to the degree of hazard presented by any one or more of change in acceleration of the vehicle, change in brake pressure, change in motion or change in vehicular speed. As desired, any of these inputs may be arranged to provide a proportional input so as to indicate degree of hazard or information as to the exceeding of a threshold so as to indicate an extreme hazard and thus cause light 222 to blink at its fastest rate. For example, input circuit 240 is presently contemplated to respond to the degree that the operator of the vehicle lets up on the accelerator. Alternatively, it may respond to a sudden complete release of the accelerator pedal so as to provide a maximum hazard indication. In any event, the system responds to one or more different inputs associated with the operating condition of the vehicle so as to provide energization of a hazard indicator in a manner which serves to indicate to other drivers the degree of the hazard encountered. At the same time, any abrupt reaction of the vehicle is caused to energize the indicator in a manner to reveal a maximum hazard.

It will thus be seen that several embodiments have been disclosed for achieving a quantitative display coordinated with degree of hazard. The primarily more-mechanical approaches offer simplicity of understanding for those engaging in field service of the systems and more freedom from external interference in operation. On the other hand, the more-electronic sophistication of the other approaches offer greater compactness and freedom from routine service.

Of course, the use of electronics systems to process signal information always is subject to interference from other sources, such as, in this case, spurious signals produced from the engine or drive train of a particular vehicle. For any given vehicle, the installation of the system may require conventional debugging by a technician to filter or by-pass such spurious signals. Alternatively, the software employed in the programming of microprocessor 200 may incorporate, in now-known manner, any of a number of techniques for identifying and eliminating the effects of spurious signals.

While particular embodiments of the invention have been shown and described, and other modifications have been discussed, it will be obvious to those skilled in the art that changes and modifications may be made without departing from the invention in its broader aspects, and, therefore, the aim in the appended claims is to cover all such changes and modifications as fall within the true spirit and scope of that which is patentable.

We claim:
1. A vehicular hazard warning system comprising:
an indicator on the vehicle and energizable to yield a warning signal;
means for detecting the onset of a hazardous condition of said vehicle and developing a control signal having a variable parameter the amount of which is proportional to the degree of hazard represented by said condition;
means responsive to said parameter for energizing said indicator in a manner which quantitatively has a magnitude that is proportional to said amount;
said detecting means including an accelerometer that develops said control signal and effects variation of said parameter in proportion to the degree of deceleration of said vehicle, said accelerometer including
a first inertial rotor driven in rotation at a speed representative of the velocity of said vehicle;
a unidirectional clutch;
a second inertial rotor coupled by said clutch to said first rotor for rotation of said rotors in unison upon acceleration of said vehicle but being uncoupled from said first rotor upon deceleration of said vehicle and thereby enabling rotation of said second rotor relative to said first rotor;
and means for effecting variation of said parameter in proportion to the speed of relative rotation of said rotors.

2. A system as defined in claim 1 in which said effecting means includes an electrical switch carried by one of said rotors and an operator of said switch carried by the other of said rotors.

3. A system as defined in claim 1 in which said effecting means includes a magnetized element carried by one of said rotors and a magnetic sensor carried by the other of said rotors, and which further includes means for coupling said sensor to said responsive means.

4. A vehicular hazard warning system comprising:
an indicator on the vehicle and energizable to yield a warning signal;
means for detecting the onset of a hazardous condition of said vehicle and developing a control signal having a variable parameter the amount of which is proportional to the degree of hazard represented by said condition;
means responsive to said parameter for energizing said indicator in a manner which quantitatively has a magnitude that is proportional to said amount;
said detecting means including an accelerometer that develops said control signal and effects variation of said parameter in proportion to the degree of deceleration of said vehicle;
said detecting means further including:
a wheel carrying said vehicle in movement along a path;
sensing means effectively coupled to said wheel for developing a digitally-recurring speed signal with a repetition rate proportional to the speed of rotation of said wheel, said sensing means including a disk axially mounted to rotate in correspondence with the speed of rotation of said wheel and with said disk including successive circumferentially-spaced regions of respective alternate magnetic polarity, and a magnetic sensor disposed adjacent to said disk and spanning spaced ones of said regions for indicating said speed signal;

and means for processing and counting individually successive increments of said speed signal and responsive to the number of said increments counted in a predetermined time interval to develop said control signal in representation of deceleration of said vehicle.

5. A vehicular hazard warning system comprising:

an indicator on the vehicle and energizable to yield a warning signal;

means for detecting the onset of a hazardous condition of said vehicle and developing a control signal having a variable parameter the amount of which is proportional to the degree of hazard represented by said condition;

means responsive to said parameter for energizing said indicator in a manner which quantitatively has a magnitude that is proportional to said amount;

said detecting means including an accelerometer that develops said control signal and effects variation of said parameter in proportion to the degree of deceleration of said vehicle;

said detecting means further including:

a wheel carrying said vehicle in movement along a path;

sensing means effectively coupled to said wheel for developing a digitally-recurring speed signal with a repetition rate proportional to the speed of rotation of said wheel, said sensing means including a disk actually mounted to rotate in correspondence with the speed of rotation of said wheel and with said disk including successive circumferentially-spaced regions of respective alternate magnetic polarity, and a magnetic sensor disposed adjacent to said disk and spanning spaced one of said regions for indicating said speed signal;

means for processing and counting individually successive increments of said speed signal and responsive to the number of said increments counted in a predetermined time interval to develop said control signal in representation of deceleration of said vehicle;

and means affixed to said vehicle for generating a crash signal in response to a sudden change in acceleration of said vehicle at a rate which exceeds a predetermined minimum, said responsive means also responding to said crash signal to energize said indicator at a quantitative maximum.

6. A system as defined in claim 5 in which said generating means responds to said sudden change when said acceleration changes in any horizontal direction of movement of said vehicle.

7. A vehicular hazard warning system comprising:

an indicator on the vehicle and energizable to yield a warning signal;

means for detecting the onset of a hazardous condition of said vehicle and developing a control signal having a variable parameter the amount of which is proportional to the degree of hazard represented by said condition;

means responsive to said parameter for energizing said indicator in a manner which quantitatively has a magnitude that is proportional to said amount;

said detecting means including an accelerometer that develops said control signal and effects variation of said parameter in proportion to the degree of deceleration of said vehicle;

means affixed to said vehicle for generating a crash signal in response to a sudden change in acceleration of said vehicle at a rate which exceeds a predetermined minimum, said responsive means also responding to said crash signal to energize said indicator at a quantitative maximum;

said generator means further including:

a cup-shaped housing that defines a cavity;

a first electrically-conductive member insulatingly disposed horizontally across the open end of said cavity;

a second electrically-conductive member also insulatingly disposed horizontally across said open end of said cavity but spaced inwardly from said first member, said second member being resiliently flexible to movement toward and away from said first member;

means defining an opening in the wall of said cavity opposite said second member;

a normally vertical shaft freely received through said opening and at one end having a nose portion adjacent to said second element;

a mass affixed to the other end of said shaft external to said cavity;

and a collar secured around said shaft with a concave surface facing and adjacent to said opposite wall, inertial movement of said mass in any direction horizontally swinging said shaft about a pivot generally within said opening and thereby moving said nose portion laterally and enabling flexural movement of said second member relative to said first member.

8. A vehicular hazard warning system comprising:

an indicator on the vehicle and energizable to yield a warning signal;

means for detecting the onset of a hazardous condition of said vehicle and developing a control signal having a variable parameter the amount of which is proportional to the degree of hazard represented by said condition;

means responsive to said parameter for energizing said indicator in a manner which quantitatively has a magnitude that is proportional to said amount;

said detecting means including an accelerometer that develops said control signal and effects variation of said parameter in proportion to the degree of deceleration of said vehicle;

an operator-controlled braking system for said vehicle, the degree of braking being proportional to a level of pressure applied;

pressure sensing means for developing a governing signal representing said level of said pressure;

and said responsive means also responding to said governing signal for energizing said indicator quantitatively at a magnitude which is proportional to said level.

9. A vehicular hazard warning system comprising:

an indicator on the vehicle and energizable to yield a warning signal;

means for detecting the onset of a hazardous condition of said vehicle and developing a control signal having a variable parameter the amount of which is proportional to the degree of hazard represented by said condition;

means responsive to said parameter for energizing said indicator in a manner which quantitatively has a magnitude that is proportional to said amount;

said detecting means including an accelerometer that develops said control signal and effects variation of said parameter in proportion to the degree of deceleration of said vehicle;

an operator-controlled braking system for said vehicle, the degree of braking being proportional to a level of pressure applied, and pressure sensing means for developing a governing signal representing said level of said pressure;

and said detecting means also reacting to said governing signal for developing said control signal.

* * * * *